US012261905B2

(12) United States Patent
Woollen et al.

(10) Patent No.: US 12,261,905 B2
(45) Date of Patent: Mar. 25, 2025

(54) DISTRIBUTING DATASET REQUESTS ACROSS SERVICE TIERS

(71) Applicant: SIGMA COMPUTING, INC., San Francisco, CA (US)

(72) Inventors: Robert C. Woollen, San Rafael, CA (US); Max H. Seiden, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 18/295,410

(22) Filed: Apr. 4, 2023

(65) Prior Publication Data

US 2024/0340337 A1 Oct. 10, 2024

(51) Int. Cl.
| H04L 67/10 | (2022.01) |
| G06F 16/28 | (2019.01) |
| G06F 40/166 | (2020.01) |
| G06F 40/194 | (2020.01) |

(52) U.S. Cl.
CPC .......... H04L 67/10 (2013.01); G06F 16/283 (2019.01); G06F 40/166 (2020.01); G06F 40/194 (2020.01)

(58) Field of Classification Search
CPC .... G06F 16/283; G06F 40/166; G06F 40/194; G06F 16/26; G06F 16/238; H04L 67/10
See application file for complete search history.

(56) References Cited

U.S. PATENT DOCUMENTS

| 8,458,596 | B1 | 6/2013 | Malks et al. | |
| 9,430,290 | B1* | 8/2016 | Gupta | G06F 9/5033 |
| 9,588,661 | B1 | 3/2017 | Jauhal et al. | |
| 10,684,777 | B2* | 6/2020 | Chambliss | G06F 3/061 |
| 10,860,259 | B1* | 12/2020 | Winarski | G06F 12/121 |
| 11,086,553 | B1* | 8/2021 | Fisher | H04L 67/1097 |
| 2016/0269926 | A1* | 9/2016 | Sundaram | H04L 67/141 |
| 2017/0123397 | A1 | 5/2017 | Billi et al. | |
| 2018/0074724 | A1* | 3/2018 | Tremblay | G06F 3/0689 |
| 2018/0101547 | A1* | 4/2018 | Greenfield | G06F 16/2228 |
| 2020/0301926 | A1* | 9/2020 | Frantz | G06F 16/2282 |
| 2020/0301938 | A1* | 9/2020 | Gale | G06F 16/254 |
| 2020/0364189 | A1* | 11/2020 | Lee | G06F 16/1834 |
| 2021/0021583 | A1* | 1/2021 | Frantz | G06F 16/283 |

(Continued)

FOREIGN PATENT DOCUMENTS

| WO | WO-2019083391 A1 * | 5/2019 | G06F 11/3034 |
| WO | WO-2020041681 A1 * | 2/2020 | G06F 16/2272 |

OTHER PUBLICATIONS

International Search Report and Written Opinion, PCT/US2024/021567, Jun. 5, 2024, 10 pages.

Primary Examiner — Chau T Nguyen (57) ABSTRACT

Distributing dataset requests across service tiers including generating, by a workbook client, a dataset request for a dataset to populate a workbook for presentation on a client computing system, wherein data for the dataset is stored on a cloud-based data warehouse; determining, by the workbook client, a set of service tiers capable of servicing at least a portion of the dataset request, wherein the set of service tiers comprises the cloud-based data warehouse; selecting, by the workbook client from the set of service tiers, a combination of service tiers to service the dataset request based on at least one selection policy; and issuing, by the workbook client, the dataset request to the selected combination of service tiers.

12 Claims, 6 Drawing Sheets

(56) References Cited

U.S. PATENT DOCUMENTS

| | | | | |
|---|---|---|---|---|
| 2021/0174238 A1* | 6/2021 | Song | ................ | G06N 20/00 |
| 2022/0021673 A1* | 1/2022 | Paulus | ................ | H04L 67/1097 |
| 2022/0172222 A1* | 6/2022 | Chin | ................ | H04L 67/10 |
| 2022/0245034 A1* | 8/2022 | Nara | ................ | G06F 11/1469 |
| 2023/0214275 A1* | 7/2023 | Abhyankar | ................ | G06F 9/5077 |
| | | | | 718/1 |

* cited by examiner

DISTRIBUTING DATASET REQUESTS ACROSS SERVICE TIERS

BACKGROUND

Field of the Invention

The field of the invention is data processing, or, more specifically, methods, apparatus, and products for distributing dataset requests across service tiers.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for distributing dataset requests across service tiers including generating, by a workbook client, a dataset request for a dataset to populate a workbook for presentation on a client computing system, wherein data for the dataset is stored on a cloud-based data warehouse; determining, by the workbook client, a set of service tiers capable of servicing at least a portion of the dataset request, wherein the set of service tiers comprises the cloud-based data warehouse; selecting, by the workbook client from the set of service tiers, a combination of service tiers to service the dataset request based on at least one selection policy; and issuing, by the workbook client, the dataset request to the selected combination of service tiers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
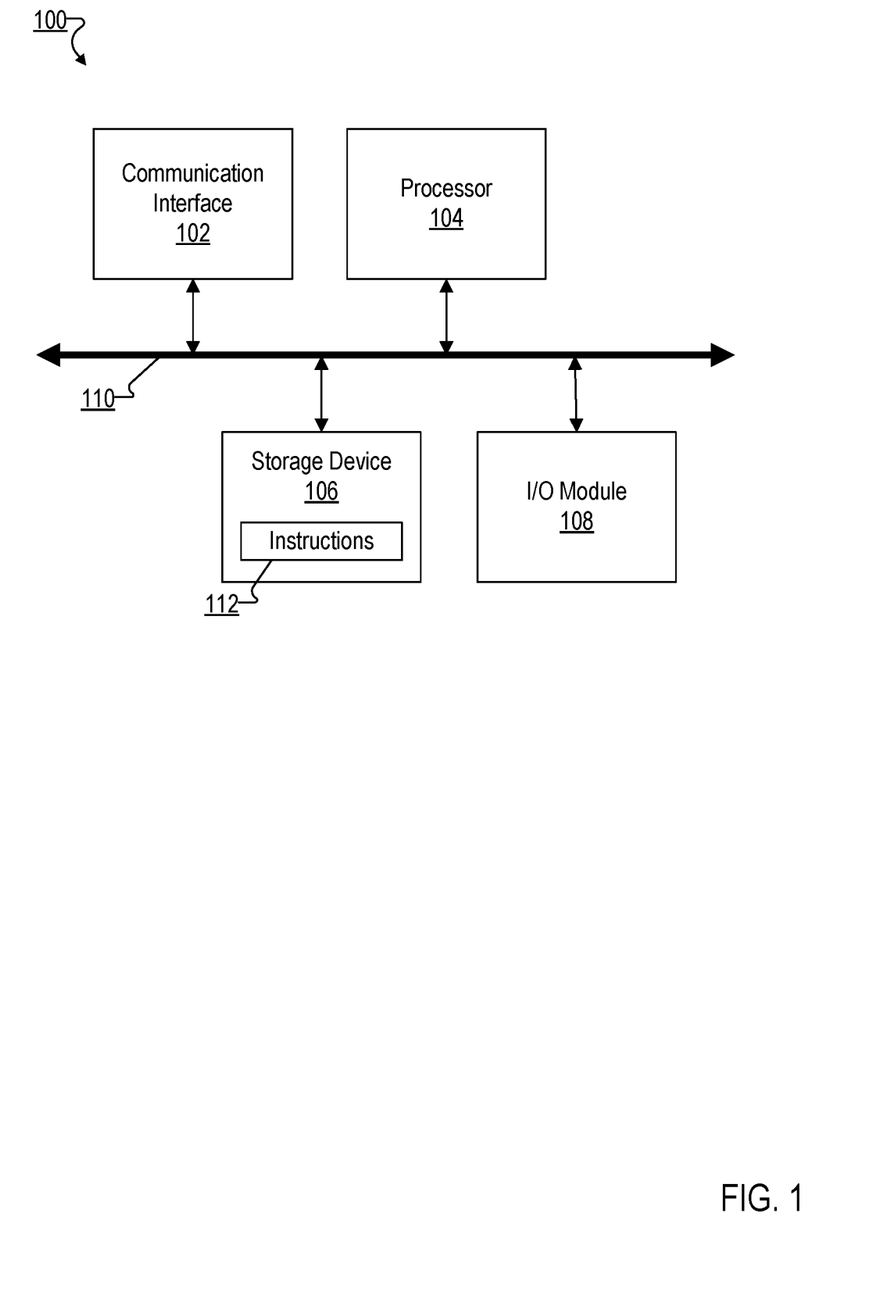
FIG. 1 sets forth a block diagram of an example system configured for distributing dataset requests across service tiers according to embodiments of the present invention.

Example methods, apparatus, and products for distributing dataset requests across service tiers in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
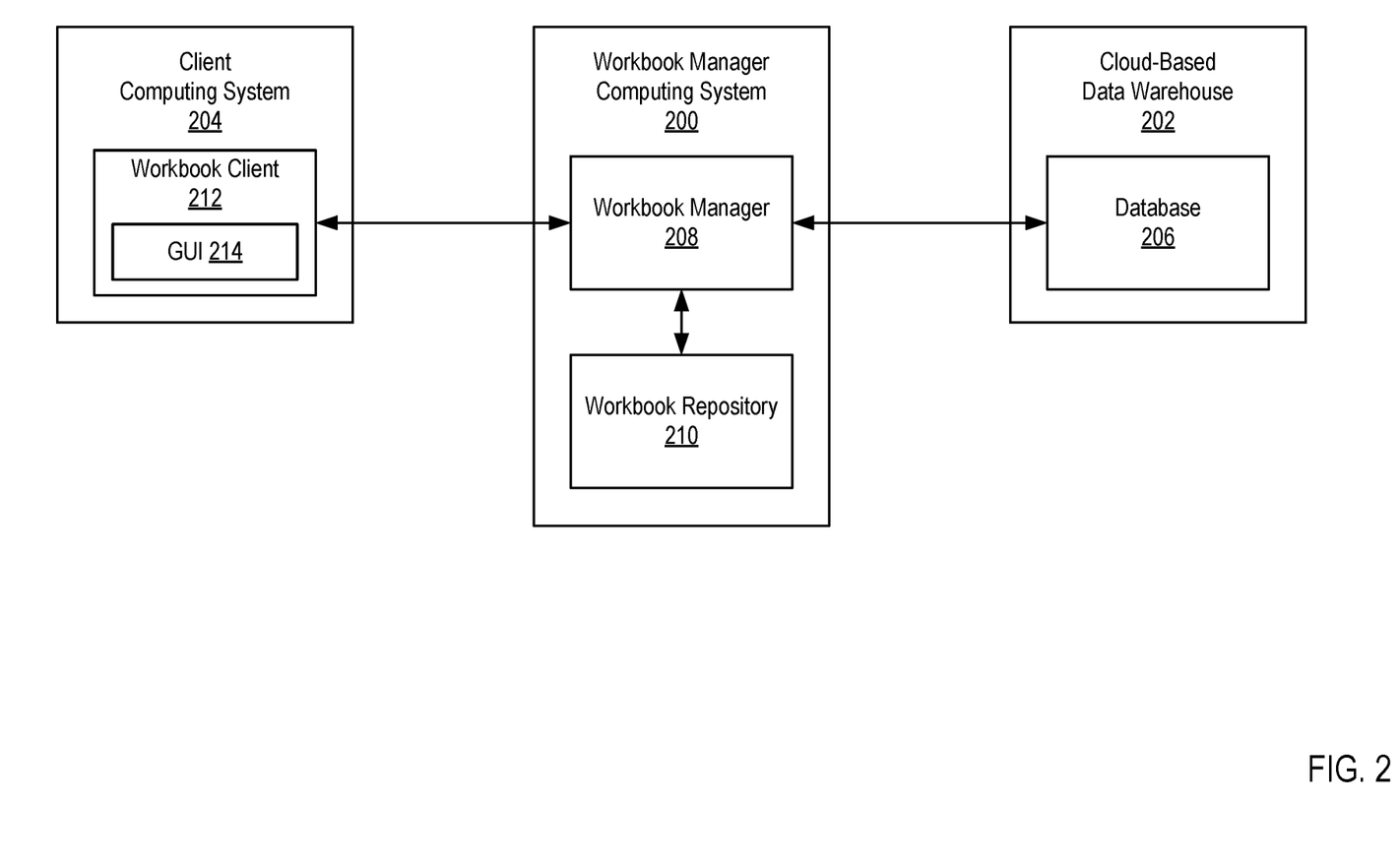
FIG. 2 sets forth a block diagram of an example system configured for distributing dataset requests across service tiers according to embodiments of the present invention.

For further explanation, FIG. 2 illustrates a block diagram depicting an exemplary system for distributing dataset requests across service tiers according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is a description and organizing mechanism for data and resides on the workbook manager computing system 200. The dataset may also include instructions for the retrieval of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
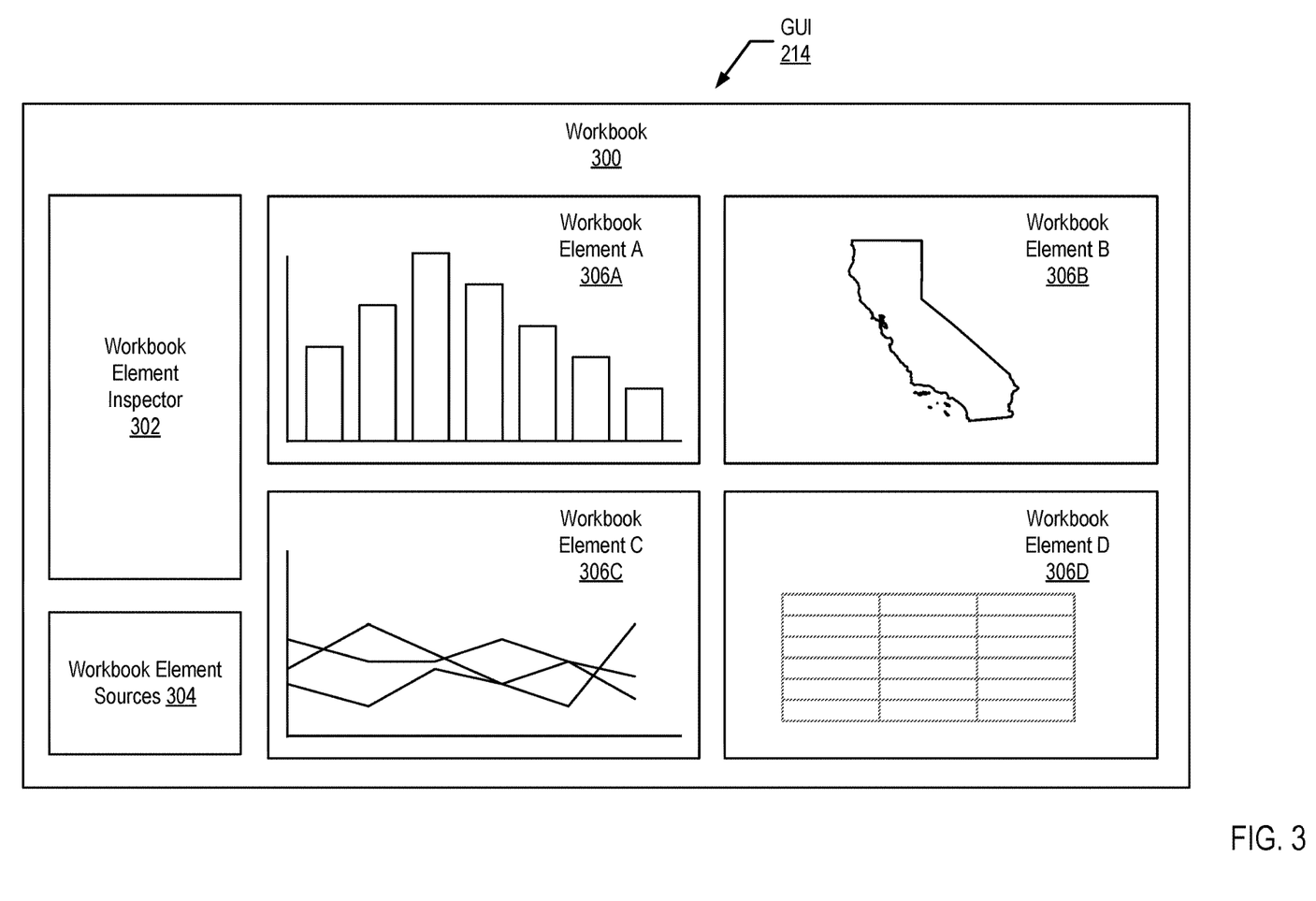
FIG. 3 sets forth a block diagram of an example system configured for distributing dataset requests across service tiers according to embodiments of the present invention.

For further explanation, FIG. 3 illustrates an exemplary GUI for distributing dataset requests across service tiers according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
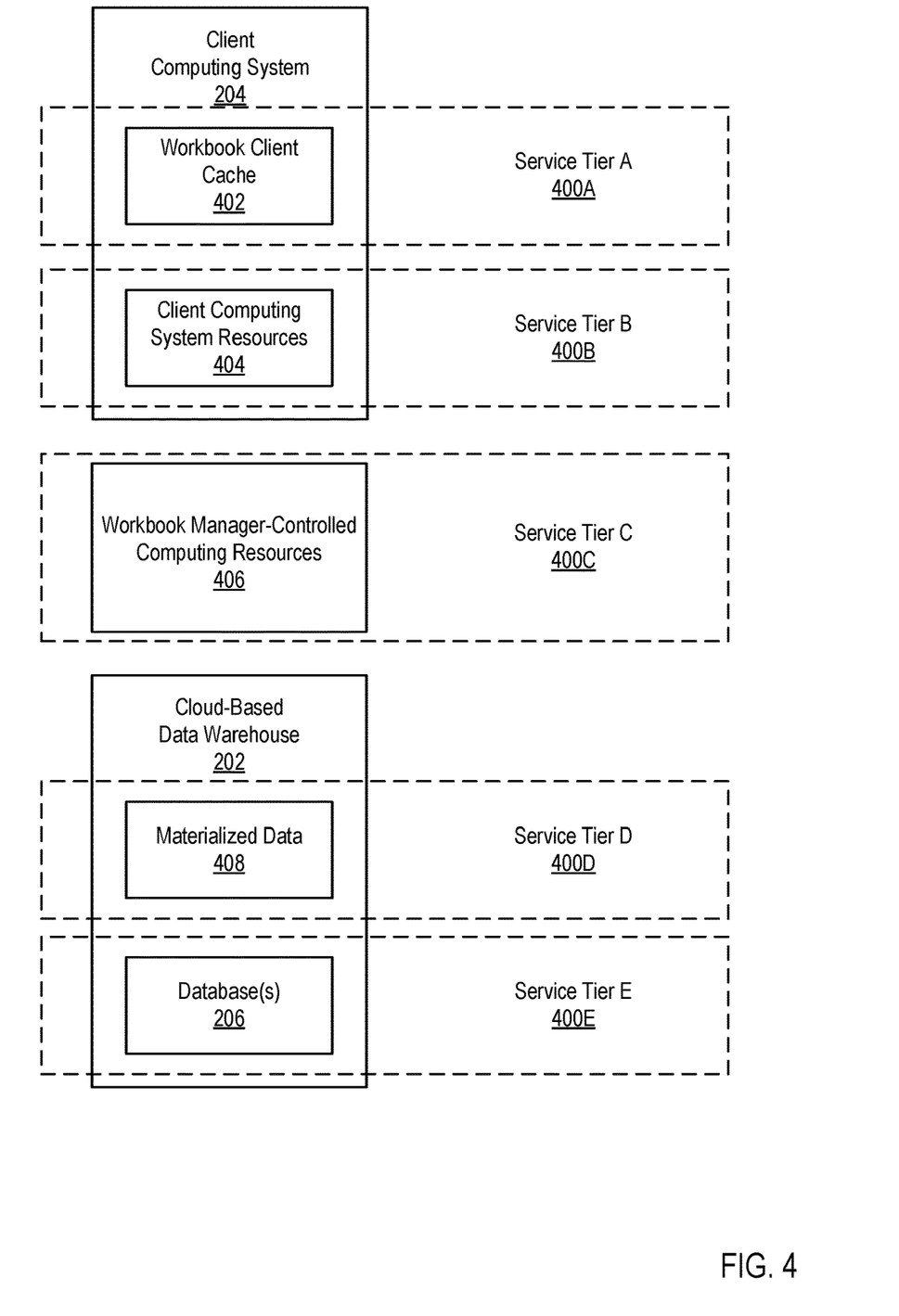
FIG. 4 sets forth a block diagram of an example service tier system configured for distributing dataset requests across service tiers according to embodiments of the present invention.

For further explanation, FIG. 4 illustrates a block diagram depicting an exemplary system of service tiers for distributing dataset requests across service tiers according to embodiments of the present invention. As shown in FIG. 4, the system includes the client computing system 204, workbook manager-controlled computing resources 406, and the cloud-based data warehouse 202. The client computing system 204 includes a workbook client cache 402 and client computing system resources 404. The cloud-based data warehouse 202 includes materialized data 408 and the database(s) 206.

As shown in FIG. 4, service tier A 400A includes the workbook client cache 402, service tier B 400B includes the client computing system resources 404, service tier C 400C includes the workbook manager-controlled computing resources 406, service tier D 400D includes the materialized data 408, and service tier E 400E includes the database(s) 206. There may exist other service tiers and associated systems not shown in FIG. 4.

Service tiers (service tier A 400A, service tier B 400B, service tier C 400C, service tier D 400D, service tier E 400E) are an abstraction used to categorize entities capable of servicing a dataset request or a portion of a dataset request. Each service tier includes different characteristics related to servicing a dataset request, including whether the data exists within the tier, and if so, a data latency, a data staleness, and a processing cost associated with servicing the dataset request.

The database(s) 206 on the cloud-based data warehouse 202 is the primary "source of truth" location for the data used to service dataset requests. The remaining tiers (service tier A 400A, service tier B 400B, service tier C 400C, and service tier D 400D) are used to bypass the database(s) 206 on the cloud-based data warehouse 202 if it is advantageous to do so. Each service tier may store a certain amount of the data from the cloud-based data warehouse 202 for servicing dataset requests depending upon the storage available to do so. The data stored on each service tier may be the result of caching previously retrieved data from the cloud-based data warehouse 202 or the result of prefetching data into the service tier.

As discussed above, each service tier may be associated with a particular data latency, a particular data staleness, and a particular processing cost associated with servicing the dataset request. Data latency refers to the amount of time necessary to deliver the data requested from the particular service tier to the source of the dataset request. Data staleness refers to the amount of time that has passed since the data was retrieved from the database 206 on the cloud-based data warehouse 202. The processing cost refers to the monetary price required to service the dataset request. The current data latency, the data staleness of the data, and the current processing cost for each service tier may be advertised to the workbook client.

Service tier A 400A includes the workbook client cache 402. The workbook client cache 402 is storage and processing resources allocated to the workbook client or the platform hosting the workbook client, such as a web browser. The workbook client cache 402 may have limited storage to store data for servicing dataset requests, but may have very low data latency and have no associated processing cost. Data staleness of data on the workbook client cache 402 may depend on caching and prefetching settings.

Service tier B 400B includes the client computing system resources 404. The client computing system resources 404 refer to computing resources outside of the workbook client cache 402 on the client computing system 204 that may be used to service dataset requests. For example, some frequently used data may be prefetched and stored on the hard drive of the client computing system 204 and the processing resources on the client computing system 204 may be used to service dataset requests issued by the workbook client on the client computing system 204. The client computing system resources 404 may have more storage available (as compared to the workbook client cache 402) to store data for servicing dataset requests and also may have very low data latency and no associated processing cost. Like the workbook client cache 402, the data staleness of data on the client computing system resources 404 may depend on caching and prefetching settings.

Service tier C 400C includes the workbook manager-controlled computing resources 406. Workbook manager-controlled computing resources 406 are cloud-based computing resources under the control of the workbook manager (e.g., employed by the workbook manager from a third-party cloud services provider) that stores data copied from the cloud-based data warehouse. The workbook manager-controlled computing resources 406 may be expandable on demand based on the requirements of the client computing system 204 and workbook manager. The workbook manager may handle dataset retrieval to and from the workbook manager-controlled computing resources 406. A portion of the data from the database(s) 206 on the cloud-based data warehouse 202 may be stored in the workbook manager-controlled computing resources 406 and requests may then be handled by the processing resources within the workbook manager-controlled computing resources 406. The workbook manager-controlled computing resources 406 may be able to provide all the necessary storage for data and all the necessary compute resources for servicing dataset requests. However, processing costs may be high. Like the workbook client cache 402 and the client computing system resources 404, the data staleness of data on the workbook manager-controlled computing resources 406 may depend on caching and prefetching settings. Further, refreshing the data on the workbook manager-controlled computing resources 406 may incur high costs from both the workbook manager-controlled computing resources 406 and the cloud-based data warehouse 202 if the amount of data stored is large.

Service tier D 400D includes the materialized data 408. Materialized data 408 is a group of query results pre-compiled to service requests for the particular data using a minimal amount of processing resources on the cloud-based data warehouse 202. Materialized data 408 may be cached query results for frequently requested data or be query results selected specifically for inclusion in the materialized data 408. The processing cost for using materialized data 408 to service dataset request may be relatively low. Data latency may also be higher than other tiers, but lower than the database(s) on the cloud-based data warehouse 202. Data staleness may be relatively low depending upon the how frequently the materialized data 408 is refreshed.

Service tier E 400E includes the database(s) 206 on the cloud-based data warehouse 202. As discussed above, the database(s) 206 are the primary "source of truth" location of the data. Consequently, there is no data staleness associated with data provided by the database(s) 206. Processing cost, however, may be higher than other tiers. Data latency may also be high relative to other tiers.

Figure 5:
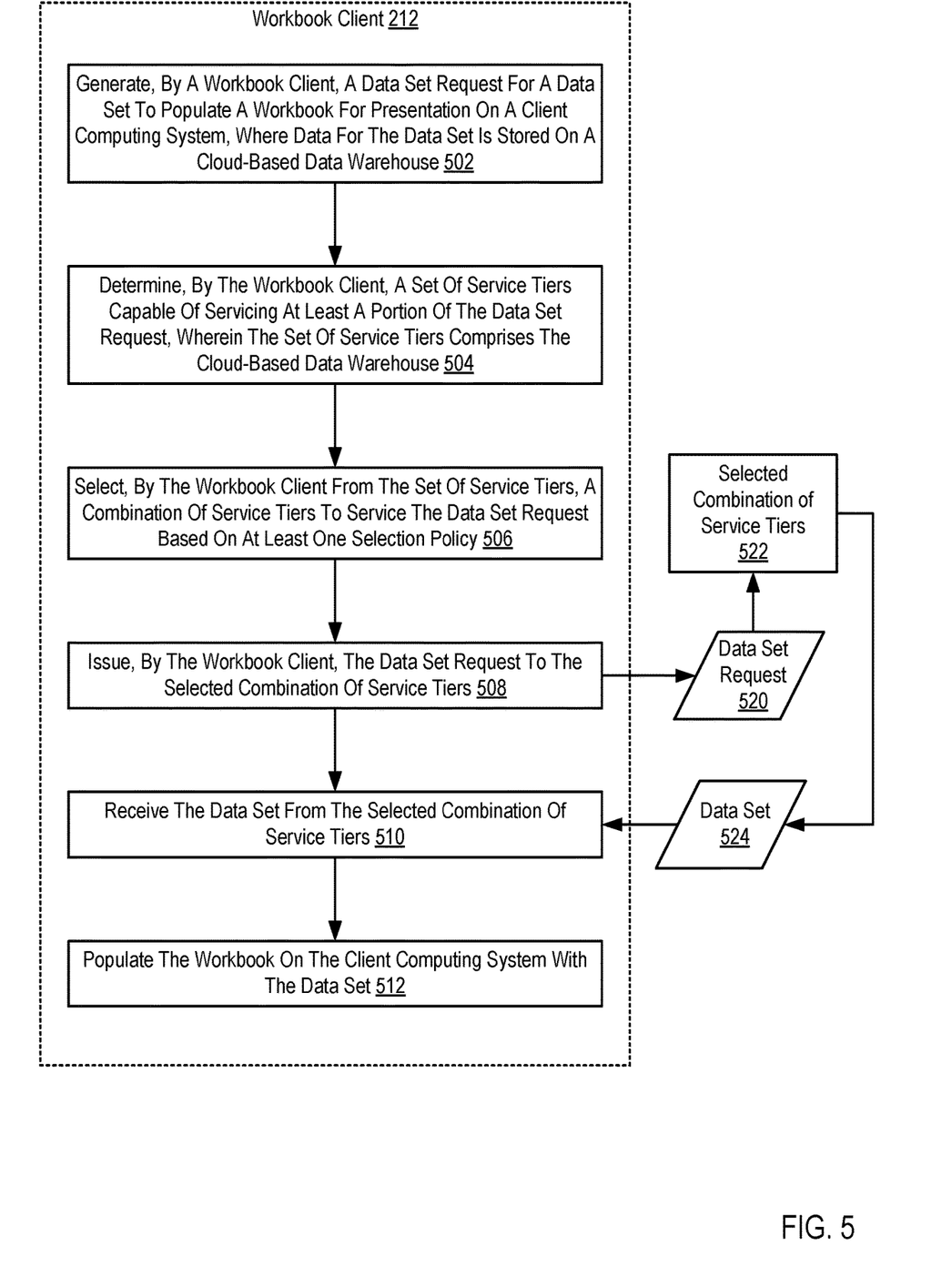
FIG. 5 sets forth a flow chart illustrating an exemplary method for distributing dataset requests across service tiers according to embodiments of the present invention.

For further explanation, FIG. 5 sets forth a flow chart illustrating an exemplary method for distributing dataset requests across service tiers according to embodiments of the present invention. The method of FIG. 5 includes generating 502, by a workbook client 212, a dataset request 520 for a dataset to populate a workbook for presentation on a client computing system, wherein data for the dataset is stored on a cloud-based data warehouse. Generating 502 the dataset request 520 may be carried out by detecting that a user has interacted with the workbook client in a manner that triggers the need for a dataset. Such interactions may include selecting the workbook for presentation (or navigating to the network location of the workbook), selecting a new page of workbook elements from the workbook, and scrolling up or down within a spreadsheet structure element.

A dataset request 520 is a description of a dataset stored (primarily) on the cloud-based data warehouse 202. The dataset request 520 may include a plurality of individual requests for different portions of the dataset. For example, the dataset request 520 may include individual requests for each workbook element and/or page of workbook elements. The dataset request 520 may be a state specification, database statement, or some intermediate form between state specification and database statement.

The method of FIG. 5 also includes determining 504, by the workbook client 212, a set of service tiers capable of servicing at least a portion of the dataset request 520, wherein the set of service tiers comprises the cloud-based data warehouse. Determining 504 the set of service tiers capable of servicing at least a portion of the dataset request 520 may be carried out by the workbook client retrieving or accessing information about the datasets currently on each available service tier. Specifically, for each available tier, the workbook client may access information about the datasets stored thereon, data staleness of each dataset, data latency for retrieving each dataset, and processing cost of retrieving each dataset. The information may be retrieved dynamically as needed or be periodically updated and stored in a location local to the workbook client (e.g., in the workbook client cache).

The method of FIG. 5 also includes selecting 506, by the workbook client 212 from the set of service tiers, a combination of service tiers 522 to service the dataset request 520 based on at least one selection policy. Selecting 506 the combination of service tiers 522 to service the dataset request 520 based on at least one selection policy may be carried out by iterating through the information about the datasets, data staleness of each dataset, data latency for retrieving each dataset, and processing cost of retrieving each dataset to determine the combination that conforms to the currently implemented selection policy.

A selection policy is a group of directives instructing the workbook client to select a particular service tier over another based on the characteristics of that service tier. The selection policy may include tolerances for service tiers, including a retrieval latency tolerance, a data staleness tolerance, and a processing cost tolerance. Such tolerances may dictate a minimum or maximum value for the particular characteristic. For example, one selection may dictate a maximum retrieval latency that the selected service tier must be within. As another example, one selection policy may dictate that any selected service tier must cost less than a maximum processing cost for servicing the dataset request 520.

The selection policy may include ranked selection directives. Specifically, a selection policy may dictate the selection of the service tier with the highest or lowest relevant value. For example, a selection policy may dictate that the service tier with the lowest data latency should be selected. A service policy may also include a combination of tolerances and ranked selection directives. For example, a service policy may dictate the selection of the service tier with the least data staleness among all service tiers with a processing cost below a specified amount.

The method of FIG. 5 also includes issuing 508, by the workbook client 212, the dataset request 520 to the selected combination of service tiers 522. Issuing 508 the dataset request 520 to the selected combination of service tiers 522 may be carried out by preparing the dataset request 520 (or each portion of the dataset request 520) for transmission to the selected combination of service tiers 522. Different service tiers may require that the dataset request 520 be in certain form. For example, the database(s) on the cloud-based data warehouse may require that the dataset request 520 be a database statement, such as a structured query language statement. As another example, the workbook client cache may require that the dataset request 520 be in form closer to the state specification of the GUI. Once prepared, the workbook client 212 may transmit the dataset request 520 to each service tier 522 based on the location and requirements of that service tier. For example, transmitting the dataset request 520 to the workbook client cache may require only accessing that location within the workbook client itself. However, transmitting the dataset request 520 to the materialized data on the cloud-based data warehouse may require transmitting a database statement within an internet protocol message.

The method of FIG. 5 also includes receiving 510 the dataset 524 from the selected combination of service tiers 522. Receiving 510 the dataset 524 from the selected combination of service tiers 522 may be carried out by the workbook client 212 detecting that each portion of the dataset 524 has been received from the selected combination of service tiers 522. Receiving 510 the dataset 524 from the selected combination of service tiers 522 may also include compiling the dataset 524 from each result received from each portion of the dataset request issued to different service tiers.

The method of FIG. 5 also includes populating 512 the workbook on the client computing system with the dataset 524. Populating 512 the workbook on the client computing system with the dataset 524 may be carried out by organizing the dataset 524 into the elements of the workbook. Once the dataset 524 is organized into the workbook, the workbook is presented to a user on the client computing system by the workbook client 212.

The above steps improve the operation of the computer system by optimizing the dataset collection process by determining an optimal or policy-consistent set of service tiers from which to retrieve a dataset for a workbook. This is accomplished by accessing information about each service tier and selecting, based on a policy, a combination of service tiers from which to retrieve the dataset.

Figure 6:
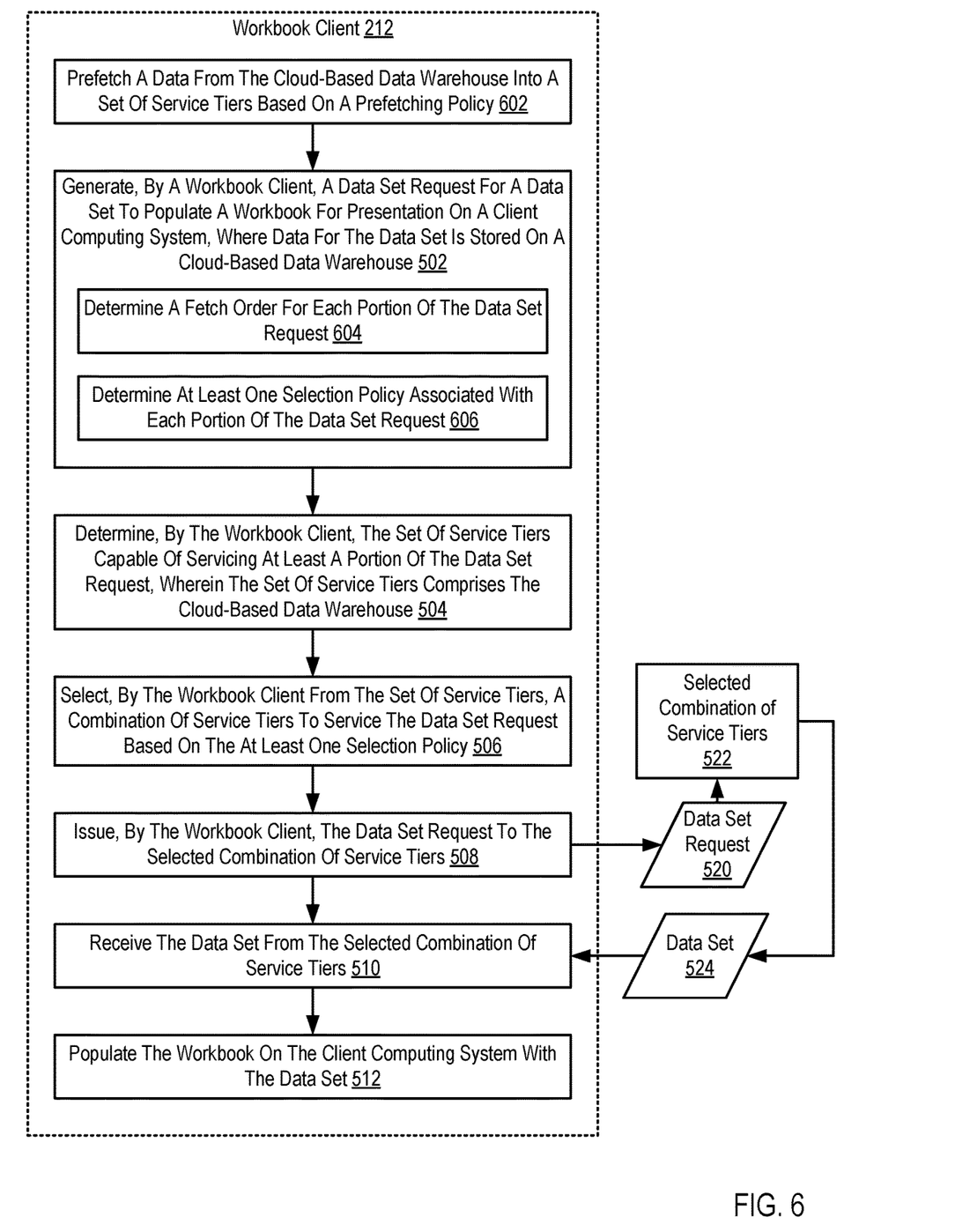
FIG. 6 sets forth a flow chart illustrating an exemplary method for distributing dataset requests across service tiers according to embodiments of the present invention.

For further explanation, FIG. 6 sets forth a flow chart illustrating a further exemplary method for distributing dataset requests across service tiers according to embodiments of the present invention that includes generating 502, by a workbook client 212, a dataset request 520 for a dataset to populate a workbook for presentation on a client computing system, wherein data for the dataset is stored on a cloud-based data warehouse; determining 504, by the workbook client 212, a set of service tiers capable of servicing at least a portion of the dataset request 520, wherein the set of service tiers comprises the cloud-based data warehouse; selecting 506, by the workbook client 212 from the set of service tiers, a combination of service tiers 522 to service the dataset request 520 based on at least one selection policy; issuing 508, by the workbook client 212, the dataset request 520 to the selected combination of service tiers 522; receiving 510 the dataset 524 from the selected combination of service tiers 522; and populating 512 the workbook on the client computing system with the dataset 524.

The method of FIG. 6 differs from the method of FIG. 5, however, in that the method of FIG. 6 further includes prefetching 602 the data from the cloud-based data warehouse into the set of service tiers based on a prefetching policy. Prefetching 602 the data from the cloud-based data warehouse into the set of service tiers based on a prefetching policy may be carried out by the workbook client (e.g., in concert with the workbook manager) retrieving datasets from the cloud-based data warehouse (or other service tier) and storing the datasets into other service tiers according to a prefetch policy.

A prefetching policy is a group of directives instructing the workbook client and/or the workbook manager to retrieve datasets and store them for later use in service tiers. The particular dataset and particular service tiers are selected for prefetching based on the directives of the prefetching policy. The prefetching policy may utilize information about frequently requested datasets or datasets that are predicted to be frequently requested. For example, frequently requested datasets or datasets that are predicted to be frequently requested may be preloaded on the service tier closest to the workbook client or in a service tier accessible with low data latency by each workbook client. The prefetching policy may utilize information about optimal service tiers for specific datasets or datasets with particular characteristics. For example, a dataset that requires costly processing may be prefetched into the materialized data or other service tier closer to the workbook clients (even if the dataset is not frequently requested).

The method of FIG. 6 also differs from the method of FIG. 5, however, in that generating 502, by a workbook client 212, a dataset request 520 for a dataset to populate a workbook for presentation on a client computing system comprises determining 604 a fetch order for each portion of the dataset request; and determining 606 at least one selection policy associated with each portion of the dataset request.

Determining 604 a fetch order for each portion of the dataset request may be carried out by iterating through a graph of nodes representing each workbook element. Specifically, each workbook element may be associated with a dataset and the relationships between workbook element datasets may be represented as a graph of nodes. For example, a first workbook element dataset that includes all of a second workbook element dataset may be represented as a parent of the second workbook element dataset. The workbook client 212 may iterate through the graph of nodes to determine an optimal order in which to place the portions of the dataset request 520. For example, a parent node dataset may be retrieved before, or instead of, a child node dataset.

Determining 606 at least one selection policy associated with each portion of the dataset request may be carried out by accessing information about each portion of the dataset and each service tier. Using the information, the workbook client may apply a selection policy to selecting the service tier for the portion of the dataset. A particular selection policy may be implemented based on characteristics of the workbook or characteristics of the workbook client, such as size of the workbook or size of the workbook client cache. A particular selection policy may be directly selected by a user of the client computing system.

In view of the explanations set forth above, readers will recognize that the benefits of distributing dataset requests across service tiers according to embodiments of the present invention include:

Improving the operation of the computer system by determining an optimal or policy-consistent set of service tiers from which to retrieve a dataset for a workbook, increasing system efficiency.

Improving the operation of the computer system by distributing datasets across a set of service tiers for efficient retrieval, increasing system efficiency.

Exemplary embodiments of the present invention are described largely in the context of a fully functional computer system for distributing dataset requests across service tiers. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for distributing dataset requests across service tiers, the method comprising:
    prefetching data from a cloud-based data warehouse into a set of service tiers based on a prefetching policy;
    generating, by a workbook client, a dataset request for a dataset to populate a workbook for presentation on a client computing system, including:
        determining a fetch order for each portion of the dataset request; and
        determining at least one selection policy associated with each portion of the dataset request;
    determining, by the workbook client, the set of service tiers capable of servicing at least a portion of the dataset request, wherein the set of service tiers comprises the cloud-based data warehouse, and wherein data to service at least one portion of the dataset request exists on the cloud-based data warehouse and at least one service tier external to the cloud-based data warehouse;
    selecting, by the workbook client from the set of service tiers, a combination of service tiers to service the dataset request based on the at least one selection policy;
    issuing, by the workbook client, the dataset request to the selected combination of service tiers;
    receiving the dataset from the selected combination of service tiers; and
    populating the workbook on the client computing system with the dataset.

2. The method of claim 1, wherein the set of service tiers comprises at least one selected from a group consisting of a workbook client cache, client computing system resources, workbook client-controlled computing resources, materialized data on the cloud-based data warehouse, and a database on the cloud-based data warehouse.

3. The method of claim 1, wherein the dataset request comprises a plurality of individual requests for different portions of the dataset.

4. The method of claim 1, wherein the at least one selection policy includes a retrieval latency tolerance.

5. The method of claim 1, wherein the at least one selection policy includes a data staleness tolerance.

6. The method of claim 1, wherein each service tier of the set of service tiers is associated with a data latency, a data staleness, and a processing cost.

7. An apparatus for distributing dataset requests across service tiers, the apparatus comprising a computer processor, a computer memory operatively coupled to the computer processor, the computer memory having disposed within it computer program instructions that, when executed by the computer processor, cause the apparatus to carry out the steps of:
    prefetching data from a cloud-based data warehouse into a set of service tiers based on a prefetching policy;
    generating a dataset request for a dataset to populate a workbook for presentation on a client computing system, including:
        determining a fetch order for each portion of the dataset request; and
        determining at least one selection policy associated with each portion of the dataset request;
    determining the set of service tiers capable of servicing at least a portion of the dataset request, wherein the set of service tiers comprises the cloud-based data warehouse, and wherein data to service at least one portion of the dataset request exists on the cloud-based data warehouse and at least one service tier external to the cloud-based data warehouse;
    selecting, from the set of service tiers, a combination of service tiers to service the dataset request based on at least one selection policy;
    issuing the dataset request to the selected combination of service tiers;
    receiving the dataset from the selected combination of service tiers; and
    populating the workbook on the client computing system with the dataset.

8. The apparatus of claim 7, wherein the set of service tiers comprises at least one selected from a group consisting of a workbook client cache, client computing system resources, workbook client-controlled computing resources, materialized data on the cloud-based data warehouse, and a database on the cloud-based data warehouse.

9. The apparatus of claim 7, wherein the dataset request comprises a plurality of individual requests for different portions of the dataset.

10. The apparatus of claim 7, wherein the at least one selection policy includes a retrieval latency tolerance.

11. The apparatus of claim 7, wherein the at least one selection policy includes a data staleness tolerance.

12. A computer program product for distributing dataset requests across service tiers, the computer program product disposed upon a non-transitory computer readable medium, the computer program product comprising computer program instructions that, when executed, cause a computer to carry out the steps of:

prefetching data from a cloud-based data warehouse into a set of service tiers based on a prefetching policy;

generating a dataset request for a dataset to populate a workbook for presentation on a client computing system, including:
  determining a fetch order for each portion of the dataset request; and
  determining at least one selection policy associated with each portion of the dataset request;

determining the set of service tiers capable of servicing at least a portion of the dataset request, wherein the set of service tiers comprises the cloud-based data warehouse, and wherein a same data to service at least one portion of the dataset request exists on the cloud-based data warehouse and at least one service tier external to the cloud-based data warehouse;

selecting, from the set of service tiers, a combination of service tiers to service the dataset request based on at least one selection policy;

issuing the dataset request to the selected combination of service tiers;

receiving the dataset from the selected combination of service tiers; and populating the workbook on the client computing system with the dataset.

* * * * *